United States Patent [19]
Putteman et al.

[11] Patent Number: 5,746,349
[45] Date of Patent: May 5, 1998

[54] CHILDPROOF DOSING DEVICE

[75] Inventors: Peter Putteman, Schellebelle; Alfons Jeanne Wouters, Beerse, both of Belgium

[73] Assignee: Janssen Pharmaceutica, N.V., Beerse, Belgium

[21] Appl. No.: 556,961

[22] PCT Filed: Jun. 30, 1994

[86] PCT No.: PCT/EP94/02149

§ 371 Date: Dec. 12, 1995

§ 102(e) Date: Dec. 12, 1995

[87] PCT Pub. No.: WO95/01924

PCT Pub. Date: Jan. 19, 1995

[30] Foreign Application Priority Data

Jul. 8, 1993 [EP] European Pat. Off. ............ 93201995

[51] Int. Cl.⁶ .................................................. B67D 5/22
[52] U.S. Cl. ........................ 222/49; 222/153.07; 141/22; 141/23
[58] Field of Search ................................ 222/49, 153.07, 222/205; 141/21, 22, 23, 24

[56] References Cited

U.S. PATENT DOCUMENTS

| | | | |
|---|---|---|---|
| 1,241,207 | 9/1917 | Gilbert | 141/23 X |
| 2,487,825 | 11/1949 | Olvis | 222/49 X |
| 2,845,963 | 8/1958 | Zackheim | 141/24 |
| 4,175,597 | 11/1979 | Peterson | 141/23 |
| 4,516,967 | 5/1985 | Kopfer | 604/87 |

FOREIGN PATENT DOCUMENTS

| | | |
|---|---|---|
| 0 542 295 A1 | 5/1993 | European Pat. Off. . |
| 882 755 | 7/1949 | Germany . |
| 2 001 597 | 2/1979 | United Kingdom . |
| WO 90/07318 | 7/1990 | WIPO . |

Primary Examiner—Gregory L. Huson
Attorney, Agent, or Firm—Charles J. Metz

[57] ABSTRACT

A childproof device (1) for holding and dispensing liquids, in particular medicines, that provides precise dosages of liquid, comprising a bottle (2), a cap (5) which is irremovable from the bottleneck (4), said cap being associated with a hollow cylinder (6) extending axially to near the bottle bottom (3) and a reciprocating dispenser comprising a barrel (8) and a plunger (9). The dispenser provides the only means of getting medicine out of the bottle since the cylinder associated with the cap prevents the contents of the bottle from being poured or shaken out. The device is easily assembled and can be stored, sold and used as supplied by the manufacturer.

13 Claims, 1 Drawing Sheet

FIG. 1
FIG. 2
FIG. 3
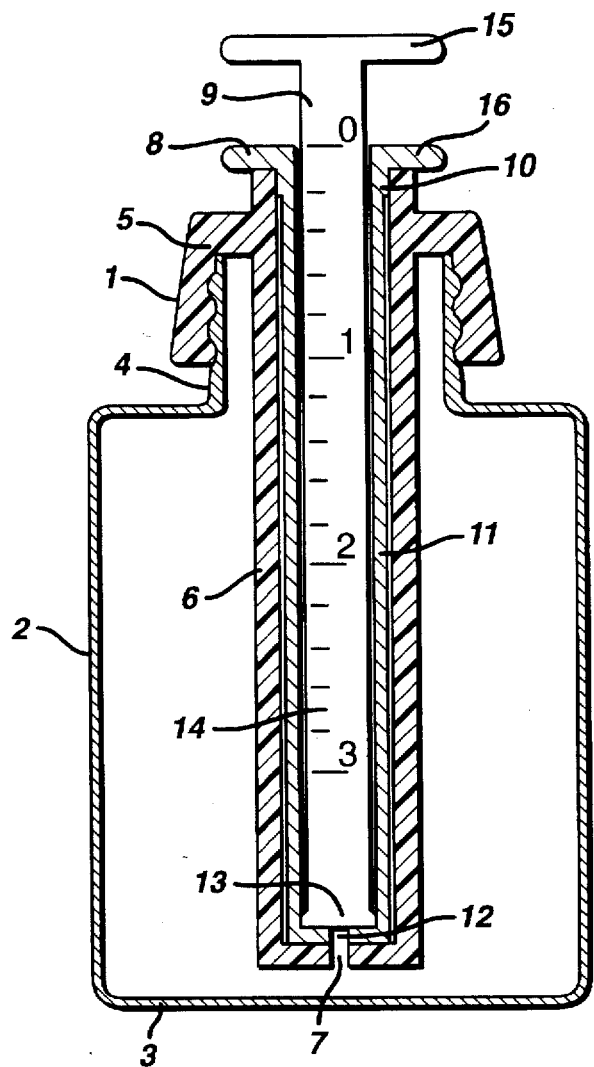
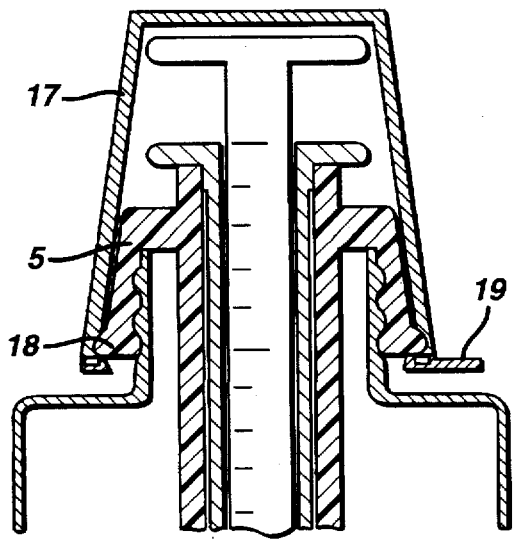
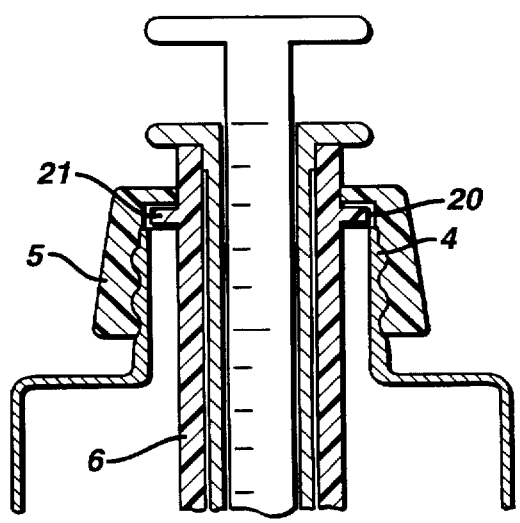

CHILDPROOF DOSING DEVICE

CROSS-REFERENCE TO RELATED APPLICATIONS

This application is based upon PCT application Ser. No. PCT/EP 94/02149, filed Jun. 30, 1994, which claims priority from European Patent Application Serial No. 93.201.995.3, filed on Jul. 8, 1993.

The present invention relates to a childproof (child-resistant) device for holding and dispensing liquids, in particular medicines, which comprises a bottle, a cap which is irremovable from the bottleneck, said cap further being associated with a hollow cylinder extending axially to near the bottle bottom, and a reciprocating dispenser fitting within said cylinder and comprising a barrel and a plunger.

The administration of liquid medicines from a bottle normally requires that the administered amount is measured so as to agree with the prescribed amount. Well known measures are teaspoonfuls, tablespoonfuls, drops and milliliters, all of which are simply poured or taken out from the medicine bottle. Usually however, nothing prevents that the whole bottle is poured out and drunk, e.g. by children. Obviously, this problem is not limited to medicines, but also occurs with household and industrial liquids in bottles and similar containers.

A number of devices have been developed which allow a measured dose of medicine to be taken out of a bottle. Most of these are particularly designed so as to yield very accurate doses which can be selected and adjusted by the user. Less attention is usually paid to safety and the devices can often be pried open easily. Where due safety measures are provided, the resulting device is often complicated, expensive and difficult to operate. A simple and easy to handle device allowing one to take out only one single dose of medicine from a bottle at a time, is therefore felt to be an outstanding need. Abuse of major, dangerous quantities of medicine (or for that matter, of household or industrial liquids) is discouraged by requiring the user to repeat a number of uninteresting moves over and over again before such a dangerous amount can be extracted from the bottle.

The problem is solved by a device for holding and dispensing liquids such as medicines that provides precise dosages of the liquid and that comprises

- a bottle for holding the liquid, said bottle extending between a bottle bottom and a bottleneck,
- a cap which is irremovable from the bottleneck, said cap being associated with a hollow cylinder extending axially to near the bottle bottom and having an open upper end and a closed lower end with a central opening,
- a reciprocating dispenser fitting within the cylinder comprising a barrel and a plunger, wherein the barrel includes an upper portion having a larger diameter than the lower portion for assuring an air- and liquid-tight fit between the upper portion and the interior wall of the cylinder, and having a closed lower end with a central opening that is aligned with the central opening in the cylinder, and wherein the plunger includes a piston, forming an air- and liquid-tight fit with the interior wall of the barrel, a graduated piston rod and a knob.

Further features and modifications as well as the advantages of the new device according to the invention will be described hereinafter in more detail, by way of example, with reference to the accompanying drawings where:

FIG. 1 shows a sectional view of a first device according to the invention;

FIG. 2 shows a sectional view of a cap with attached beaker and tear-off band; and FIG. 3 is a sectional view of the top of a device wherein cap and cylinder are separate.

The present device (1) for holding and dispensing liquid medicines provides precise dosages of the medicine and comprises a bottle (2) for holding the liquid medicine, said bottle extending between a bottle bottom (3) and a bottleneck (4). The bottle is conveniently made out of glass or an acceptable rigid plastic such as polyethylene or polypropylene, and typically may have a capacity of 0.11.

The cap (5) is irremovably fastened to the bottleneck (4) so that it cannot be pried off. A preferred system involves mating, snap-fitting rib and groove formations at the outside of the bottleneck and the inside of the cap. This system has the advantage that it can be assembled easily and automatically and cannot reasonably be disassembled without breaking. Further, said cap (5) is associated with a hollow cylinder (6) extending axially to near the bottle bottom (3) and having an open upper end and a closed lower end with a central opening (7).

The device of the invention further comprises a reciprocating dispenser fitting within the cylinder (6) and comprising a barrel (8) and a plunger (9). The dispenser is effective in drawing up and dispensing single, measured doses of the liquid medicine. The barrel (8) includes an upper portion (10) having a larger diameter than the lower portion (11) for assuring an air- and liquid-tight fit between the upper portion (10) and the interior wall of the cylinder (6), and having a closed lower end with a central opening (12) that is aligned with the central opening (7) in the cylinder (6). The plunger (9) includes a piston (13) forming an air- and liquid-tight fit with the interior wall of the barrel (8), a graduated piston rod (14) and a knob (15).

The upper part of the barrel (8) is further provided with an annular flange (16) which juts outwards over the rim of the cylinder (6). The barrel has a height and inside diameter such that its chamber volume equals desired liquid medicine doses, typically ranging up to 5 ml.

The graduated piston rod is calibrated, preferably in units of volume, the zero line (empty dispenser) being aligned with the top of the annular flange (16) when the plunger is inserted completely in the barrel. A user of the present device should simply pull up the knob (15) of the plunger until the desired amount of medicine is indicated by the fact that the appropriate calibration on the piston rod is aligned with the top of the annular flange (16).

It should be noted that the liquid medicine can only be drawn up in the barrel (8) when said barrel is completely inserted in the cylinder (6). Only then does the upper portion (10) provide the necessary air-tight seal between barrel and cylinder and is the chamber volume defined by the inside of the barrel in fluid communication with the bottle (2) through the aligned openings (7) and (12) forming a conduit.

The length of the upper portion (10) having a larger diameter than the lower portion (11) preferably is small so that upon withdrawing the barrel (8) from the cylinder (6) the least possible liquid medicine is drawn up in the cylinder. Yet, its length should be sufficient to provide an air-tight seal when fully inserted in the cylinder.

Upon withdrawal of the dispenser from the cylinder, no amount of movements allows liquid medicine to be taken out or spilled. For example, upturning of the device causes the central opening (7) at the closed lower end of the cylinder to project in the air above the fluid level in the upturned bottle preventing the contents of the bottle to be poured or shaken out. Thus, a fully inserted dispenser provides the only means of getting medicine out of the bottle.

Advantageously, the device according to the present invention can further comprise a beaker (17) removably snap-fitting over an external flange (18) on the cap (5) (see FIG. 2). The beaker (17) is intended to be charged with the desired liquid medicine dose drawn up with the dispenser, and—if and when needed—with other liquids such as water or a beverage in order to dilute the medicine. The capacity of the beaker typically is about four to six times the maximum chamber volume of the dispenser. The provision of a beaker with the instant device should dissuade the user from for example discharging the medicine directly into the mouth and possibly contaminating the dispenser and eventually the contents of the device. At the same time the beaker provides a further protective seal for the device during storage.

In order to render the device tamperproof, the beaker (17) is advantageously connected to the cup (5) by a tear-off seal, strip or band (19). Thus the dispenser can be kept neatly covered up and cannot be contaminated, nor for that matter can the medicine in the device. The tear-off band should be removed only immediately prior to use and provides an easily discernable proof of non-tampering with the device. Removal of the tear-off band and the beaker enables the dispenser to be withdrawn from the cylinder.

The child-resistant character of the device according to the present invention can be further enhanced by substituting the beaker (17) by an art-known child-resistant outer screw cap removably fitting to the cap (5). Of particular utility in this regard are those child-resistant screw caps that can only be removed by exerting a depressing and rotating force. In the absence of said depressing force the outer cap is freely rotatable with respect to the cap (5). Evidently, such child-resistant outer screw caps are not fit to be used as beakers. The child-resistant outer screw cap and the snap-fitting cap (5) are advantageously connected to one another with a tear-off band (19) as described before.

Further it should be noted that the cap (5) and cylinder (6) need not necessarily form an integral part, but may consist of two separate parts and a washer (20) (see FIG. 3). In order to fasten the cylinder in the cap, the cylinder is provided with an external flange (21) extending radially. The washer (20) fits the external flange (21), juts over the rim of the bottleneck (4) and provides an air-tight seal between the cap and cylinder.

The device according to the instant invention is easily assembled, including with automatic machinery, by pressing a cap (5) fitted with a reciprocating dispenser as described on a bottle filled with a suitable amount of liquid. The device can be stored, sold and used as supplied by the manufacturer. Besides its being childproof, simple and hygienic, the device according to the present invention has the further advantage that the cap (5), the cylinder (6) and the reciprocating dispenser can be manufactured in a range of different dosages each with different diameters and/or lengths. The cap (5) and reciprocating dispenser as described before, either assembled or not, with or without beaker (17) or child-resistant outer screw cap, are meant to comprise a further aspect of the present invention.

We claim:

1. A device (1) for holding and dispensing liquids that provides precise dosages of the liquid, comprising a bottle (2) for holding the liquid, said bottle extending between a bottle bottom (3) and a bottleneck (4), a cap (5) which is irremovable from the bottleneck, said cap being associated with a hollow cylinder (6) extending axially to near the bottle bottom (3) and having a open upper end and a closed lower end with a central opening (7), a reciprocating dispenser fitting within the cylinder (6) comprising a barrel (8) and a plunger (9), wherein the barrel (8) includes an upper portion (10) having a larger diameter than the lower portion (11) for assuring an air- and liquid-tight fit between the upper portion and the interior wall of the cylinder (6), and having a closed lower end with a central opening (12) that is aligned with the central opening (7) in the cylinder (6), and wherein the plunger (9) includes a piston (13) forming an air- and liquid-tight fit with the interior wall of the barrel (8), a graduated piston rod (14) and a knob (15).

2. A device according to claim 1 wherein the cap (5) snap-fits with rib and groove formations to the bottleneck (4).

3. A device according to claim 1 wherein the cap (5) comprises an external flange (18), and said device further comprises a beaker (17) removably snap-fitting with said external flange.

4. A device according to claim 3 wherein the beaker (17) is connected to the cap (5) by a tear-off band (19).

5. A device according to claim 1 wherein a child-resistant outer screw cap is removably fitted to the cap (5).

6. A device according to claim 5 wherein the child-resistant outer screw cap is connected to the cap (5) by a tear-off band (19).

7. A device according to claim 1 wherein the cap (5) and the cylinder (6) associated therewith are separate, said cylinder comprising an external flange (21) extending radially, said device further comprising a washer (20) holding the separate cylinder by the external flange and providing an air- and liquid-tight fit between the cap and the cylinder.

8. A cap-dispenser arrangement adapted for use with a device (1) for holding and dispensing liquids that provides precise dosages of the liquid, which device comprises a bottle (2) for holding the liquid, said bottle extending between a bottle bottom (3) and a bottleneck (4), wherein said cap-dispenser arrangement comprises:

a cap adapted to fit irremovably from the bottleneck, said cap being associated with a hollow cylinder (6) extending axially a distance such that when the cap is fitted to the bottleneck the cylinder extends to near the bottle bottom (3) and having an open upper end and a closed lower end with a central opening (7), a reciprocating dispenser fitting within the cylinder (6) comprising a barrel (8) and a plunger (9), wherein the barrel (8) includes an upper portion (10) having a larger diameter than the lower portion (11) for assuring an air- and liquid-tight fit between the upper portion and the interior wall of the cylinder (6), and having a closed lower end with a central opening (12) that is aligned with the central opening (7) in the cylinder (6), and wherein the plunger (9) includes a piston (13) forming an air- and liquid-tight fit with the interior wall of the barrel (8), a graduated piston rod (14) and a knob (15).

9. The cap according to claim 8 wherein the cap (5) is adapted to snap-fit with rip and groove formations to the bottle-neck (4).

10. The cap according to claim 8 wherein the cap (5) includes an external flange (18) and a beaker (17) adapted to removably snap-fit with said external flange.

11. The cap according to claim 10 wherein the beaker (17) is connected to the cap (5) by a tear-off band (19).

12. A cap according to claim 8 wherein a child-resistant outer screw cap is removably fitted to the cap (5).

13. A cap according to claim 12 wherein the child-resistant outer screw cap is connected to the cap (5) by a tear-off band (19).

* * * * *